United States Patent
Fusayuki

(10) Patent No.: US 7,880,906 B2
(45) Date of Patent: Feb. 1, 2011

(54) IMAGE FORMING SYSTEM CAPABLE OF ADDING AN IMAGE FOR RESTRAINING COPYING TO PRINTED MATTER

(75) Inventor: Fujita Fusayuki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1360 days.

(21) Appl. No.: 11/003,174

(22) Filed: Dec. 2, 2004

(65) Prior Publication Data

US 2005/0141015 A1    Jun. 30, 2005

(30) Foreign Application Priority Data

Dec. 3, 2003 (JP) ............................ 2003-405003

(51) Int. Cl.
*G06K 15/00* (2006.01)
*G06F 3/12* (2006.01)

(52) U.S. Cl. ..................................... 358/1.14; 358/1.15

(58) Field of Classification Search .................. 358/1.1, 358/1.9, 1.13, 1.14, 1.15, 1.18, 449; 399/366
See application file for complete search history.

(56) References Cited

U.S. PATENT DOCUMENTS 6,512,915 B2    1/2003  Matsunoshita et al.
7,259,878 B2 *  8/2007  Ishida et al. ............... 358/1.14
2003/0112259 A1 * 6/2003  Kinjo ........................ 345/700

FOREIGN PATENT DOCUMENTS

| JP | 02-135868 | 5/1990 |
|---|---|---|
| JP | 09-164739 | 6/1997 |
| JP | 2000-022937 | 1/2000 |
| JP | 2002-015220 | 1/2002 |
| JP | 2003-143336 | 5/2003 |
| JP | 2003-208300 | 7/2003 |
| JP | 2003-308527 | 10/2003 |
| JP | 2001-222095 | 8/2004 |

* cited by examiner

*Primary Examiner*—Gabriel I Garcia
(74) *Attorney, Agent, or Firm*—Edwards Angell Palmer & Dodge LLP; David G. Conlin; Catherine J. Toppin

(57) ABSTRACT

A folder created in a print data storing region for storing print data received from an external device is checked. When it is judged that there is print data, a print job is created by adding a restraining image corresponding to the folder to the print data. The created print job is transmitted to a multi-function printer, and an image with the added restraining image is formed on paper. It is thus possible to add an image for restraining copying.

4 Claims, 17 Drawing Sheets

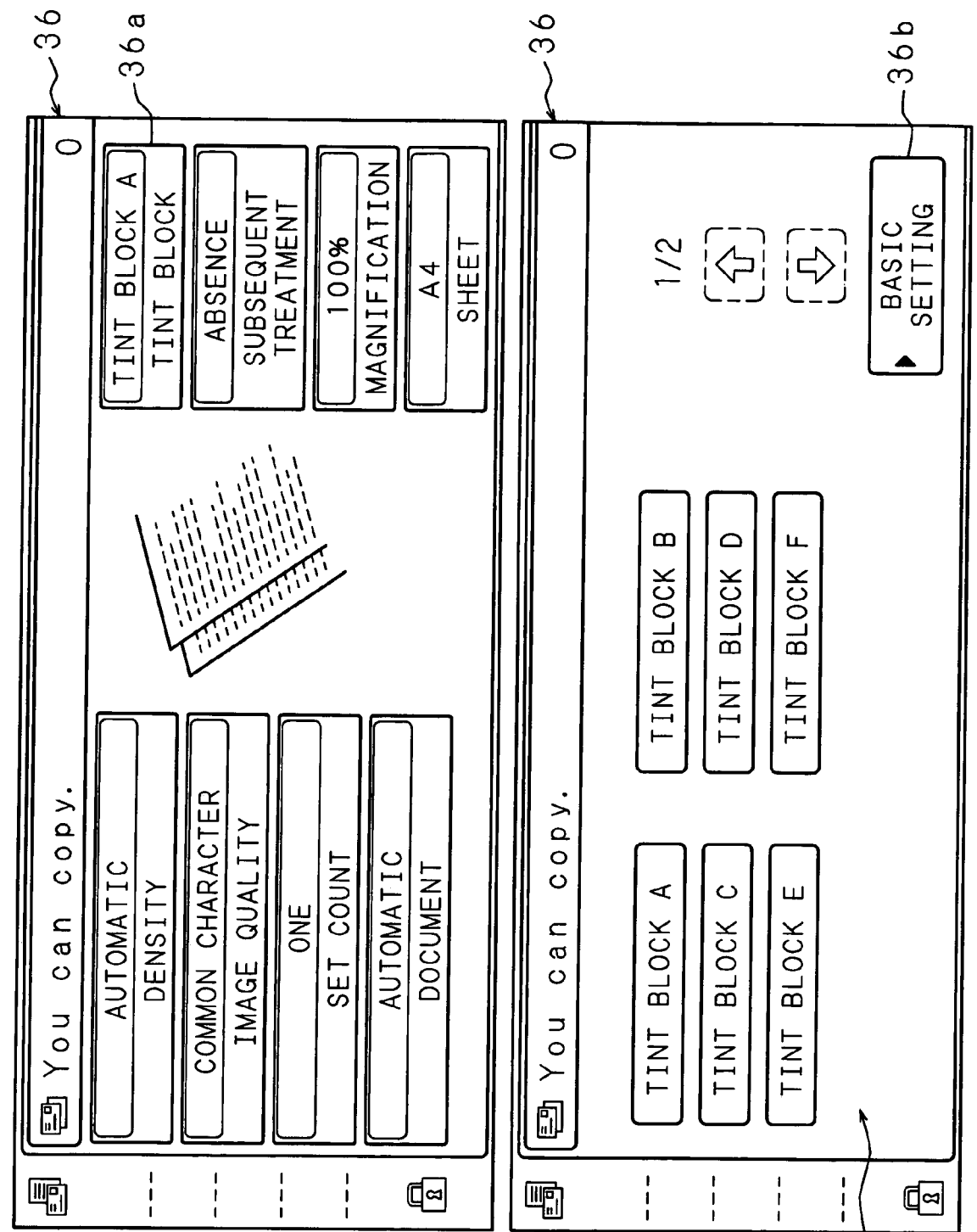

IMAGE FORMING SYSTEM CAPABLE OF ADDING AN IMAGE FOR RESTRAINING COPYING TO PRINTED MATTER

CROSS-REFERENCE TO RELATED APPLICATION

This non-provisional application claims priority under 35 U.S.C. §119(a) on Patent Application No. 2003-405003 filed in Japan on Dec. 3, 2003, the entire contents of which are hereby incorporated by reference.

BACKGROUND OF THE INVENTION

The present invention relates to an image forming system, image processing apparatus and image forming apparatus capable of adding an image for restraining copying to printed matter, and a memory product storing a computer program for realizing the image processing apparatus and the image forming apparatus.

As one of techniques for preventing copying of printed matter, a technique using a tint block pattern in the background of a document which is prohibited from being copied has been known. A tint block pattern consists of dots (foreground dots) in a size that remain even when a copy is made using a copying machine, and dots (background dots) which are so small and disappear when a copy is made. The background dots are arranged around the foreground dots so that characters and patterns drawn by the foreground dots are not noticeable. When printed matter on which a tint block pattern is formed is copied, the background dots disappear and only the foreground dots remain, and consequently the characters and patterns drawn by the foreground dots appear. Therefore, by embedding characters such as "copy-prohibited" and "confidential document" drawn by the foreground dots in the tint block pattern in advance, the printed matter to be produced can have the effect of restricting copying by itself.

The technique for preventing copying using a tint block pattern is mainly classified into two types. One is a technique using a special paper on which a tint block pattern is printed in advance, and the other is a technique in which a tint block pattern and a document are printed together as to be described later. With the former technique, by setting the special paper with the tint block pattern on a paper feed tray of a printer and printing a document, printed matter having the copy preventing effect is obtained. However, since it is necessary to prepare the paper on which the tint block pattern is printed in advance, such a technique has the problem of an increase in the cost of printing. Moreover, since predetermined characters and patterns for restricting copying are used, it is difficult to change the tint block pattern according to a document, and thus this technique also has the problem of lack of convenience.

Therefore, in recent years, a technique was proposed to print a tint block pattern on normal paper, etc. by providing a printer driver with the function of adding a tint block pattern to the image of a document to be printed (see, for example, Japanese Patent Application Laid Open No. H09-164739). According to this technique, in an information processing apparatus in which the printer driver is installed, the process of compositing image data for a document and image data for a tint block pattern is performed, and print processing is performed based on the image data obtained by compositing, and thus the document with the tint block pattern in the background can be formed on normal paper. Further, by preparing a plurality of types of tint block patterns in the printer driver, it is possible to select and use a tint block pattern according to a document.

However, the technique of adding a tint block pattern using a printer driver has a problem that this technique can be used only with a printer compatible with the printer driver, and its narrow application range has been pointed out. In other words, for printer drivers which have already been shipped in the market, it is necessary to wait for the function of printing a tint block pattern to be added by updates of the printer drivers or other method, and thus there is a problem, namely there is no guarantee that this function is available at the time the user wishes to introduce this technique. Besides, if a new printer having such a function is introduced instead of waiting for an update of the printer driver, it causes the problem of an extreme increase in the introduction cost.

Further, there is also a demand for copy protection for printed matter which is produced using a copying machine, but the demand has not been satisfied at present.

BRIEF SUMMARY OF THE INVENTION

The present invention has been made with the aim of solving the above problems, and it is an object of the present invention to provide an image forming system capable of adding a copy preventing image or the like without causing an increase in the introduction cost by constructing an image forming system, including a relay device connected to an image transmitting apparatus and an image forming apparatus, so that the relay device receives image data transmitted from the image transmitting apparatus, composites predetermined image data onto the received image data and transmits the image data obtained by compositing to the image forming apparatus, and that the image forming apparatus forms an image on a sheet based on the image data transmitted from the relay device.

Another object of the present invention is to provide an image forming system capable of adding a copy preventing image or the like without causing an increase in the introduction cost by constructing the image forming system so that the image transmitting apparatus composites predetermined image data onto received image data and transmits the image data obtained by compositing to the image forming apparatus, and that the image forming apparatus forms an image on a sheet based on the image data transmitted from the image transmitting apparatus.

Still another object of the present invention is to provide an image processing apparatus capable of being incorporated into a conventional imaging system and capable of adding a copy preventing image or the like by constructing an image processing apparatus comprising storage means for storing one or a plurality of pieces image data so that the image processing apparatus composites the image data stored in the storage means onto image data received from an external device and transmits the image data obtained by compositing to an external device.

Yet another object of the present invention is to provide an image forming apparatus capable of being used alone and capable of adding a copy preventing image or the like by constructing an image forming apparatus comprising storage means for storing predetermined image data so that the image forming apparatus composites the image data stored in the storage means onto image data obtained by reading an image of a document, and forms an image on a sheet based on the image data obtained by compositing.

A further object of the present invention is to provide a memory product storing a computer program that enables the addition of a copy preventing image or the like by causing a computer to detect image data stored in first storage means and composite image data pre-stored in second storage means onto the detected image data.

An image forming system according to the present invention is an image forming system comprising: an image transmitting apparatus for generating image data and transmitting the generated image data to an external device; and an image forming apparatus for receiving the image data transmitted from the image transmitting apparatus and forming an image on a sheet based on the received image data, and characterized by comprising a relay device connected to the image transmitting apparatus and the image forming apparatus, wherein the relay device comprises: a storage unit for storing predetermined image data; means for receiving the image data transmitted from the image transmitting apparatus; means for compositing the image data stored in the storage unit onto the received image data; and a transmitting unit for transmitting the image data obtained by compositing to the image forming apparatus, and the image forming apparatus forms an image on a sheet based on the image data received from the relay device.

According to the present invention, the image forming system comprises a relay device connected to both of an image transmitting apparatus and an image forming apparatus; the relay device composites predetermined image data, which is pre-stored, onto image data received from the image transmitting apparatus and transmits the image data obtained by compositing to the image forming apparatus; and the image forming apparatus forms an image on a sheet based on the composite image data. Therefore, there is no need to newly introduce a special printer for producing printed matter with an added predetermined image such as a tint block pattern, and it is possible to produce printed matter with an added predetermined image such as a tint block pattern by incorporating the relay device into an image forming system composed of a conventional image forming apparatus such as a printer and a digital multi-function printer, and an image transmitting apparatus such as a personal computer.

An image forming system according to the present invention is an image forming system comprising: an image transmitting apparatus having means for transmitting image data; and an image forming apparatus for receiving the image data transmitted from the image transmitting apparatus and forming an image on a sheet based on the received image data, and characterized in that the image forming apparatus has means for generating image data and a transmitting unit for transmitting the generated image data to the image transmitting apparatus, and the image transmitting apparatus has a storage unit for storing predetermined image data, means for receiving image data transmitted from the image forming apparatus and means for compositing the image data stored in the storage unit onto the received image data, and transmits the image data obtained by compositing to the image forming apparatus.

According to the present invention, the image forming system comprises an image forming apparatus for generating image data and forming an image on a sheet, and an image transmitting apparatus connected to the image forming apparatus; the image transmitting apparatus composites predetermined image data, which is pre-stored, onto image data received from the image forming apparatus, and transmits the image data obtained by compositing to the image forming apparatus; and the image forming apparatus forms an image based on the image data. Therefore, there is no need to newly introduce a special printer for producing printed matter with an added predetermined image such as a tint block pattern, and it is possible to produce printed matter with an added predetermined image such as a tint block pattern by connecting the image transmitting apparatus to the image forming apparatus such as a conventional copying machine and a digital multi-function printer.

An image processing apparatus according to the present invention is an image processing apparatus for receiving image data from an external device, performing image processing on the received image data and transmitting the resulting image data to an external device, and characterized by comprising: a storage unit for storing one or a plurality of pieces of image data; and means for compositing the image data stored in the storage unit onto the received image data, wherein the image data obtained by compositing is transmitted to an external device.

According to the present invention, the image processing apparatus comprises a storage unit for storing one or a plurality of pieces of image data, composites the image data stored in the storage unit onto image data received from an external device, and transmits the image data obtained by compositing to an external device. Therefore, it is possible to composite image data by adding a predetermined image such as a tint block pattern to an image for printing, and it is possible to produce printed matter with an added tint block pattern by transmitting the image data obtained by compositing to an image forming apparatus, such as a printer, a copying machine and a digital multi-function printer, and performing print processing.

An image processing apparatus according to the present invention is characterized by comprising a received data storage unit for storing received image data, wherein the image data stored in the storage unit is composited onto the image data stored in the received data storage unit.

According to the present invention, the image processing apparatus comprises a received data storage unit for storing received image data, and composites the image data stored in the storage unit onto the image data stored in the received data storage unit. Therefore, even if many pieces of image data for printing are present, it is possible to temporarily store these image data and composite predetermined image data onto the stored image data, and consequently it is possible to execute the image data compositing process without decreasing processing efficiency.

An image processing apparatus according to the present invention is characterized by comprising: a plurality of storing regions for storing received image data; an information storage unit for storing information about a storing location of image data to be composited, in association with each storing region; and means for reading image data to be composited according to each storing region, wherein the image data in the storage unit is composited according to each storing region.

According to the present invention, image data to be composited is read from the storage unit according to a storing region storing the received image data, and the image data read from the storage unit is composited. It is therefore possible to add a different image according to a storing location of received image data.

An image processing apparatus according to the present invention is characterized by comprising: a sender information storage unit for storing a plurality of pieces of information about senders of image data; an information storage unit for storing information about a storing location of image data to be composited according to each sender, in association with the information about senders; a receiving unit for receiving the information about the sender of image data when receiving the image data; and means for reading image data to be composited from the storage unit based on the information received by the receiving unit, wherein the read image data is composited onto the received image data.

According to the present invention, image data to be composited according to a sender of image data is read from the storage unit, and the image data read from the storage unit is composited onto the received image data. It is therefore possible to add a different image according to a sender of image data.

An image processing apparatus according to the present invention is characterized by comprising: a recipient information storage unit for storing a plurality of pieces of information about recipients of image data obtained by compositing; an information storage unit for storing information about a storing location of image data to be composited according to each recipient, in association with the information about recipients; a receiving unit for receiving the information about the recipient of image data to be obtained by compositing when receiving image data; and means for reading image data to be composited from the storage unit based on the information received by the receiving unit, wherein the read image data is composited onto the received image data.

According to the present invention, image data to be composited is read from the storage unit according to a recipient of the image data, and the image data read from the storage unit is composited onto the received image data. It is therefore possible to add a different image according to a recipient of image data.

An image processing apparatus according to the present invention is characterized by comprising an accepting unit for accepting a selection of image data to be composited onto the received image data, wherein the image data selected by the accepting unit is composited onto the received image data.

According to the present invention, a selection of image data to be composited is accepted, and the selected image data is composited onto the received image data. Thus, since image data selected by the user is composited onto received image data, it is possible to provide a flexible method according to the user.

An image processing apparatus according to the present invention is characterized by further comprising means for invalidating, after transmitting image data obtained by compositing to an external device, the image data and the received original image data.

According to the present invention, after transmitting the image data obtained by compositing to an external device, the image data and the received original image data are invalidated, thereby preventing leakage of information contained in the received image data and improving security.

An image processing apparatus according to the present invention is characterized by further comprising means for creating a job to instruct formation of an image based on image data obtained by compositing, wherein the created job is transmitted to an external device.

According to the present invention, a job to instruct formation of an image based on image data obtained by compositing is created, and the created job is transmitted to an external device. Consequently, a job to instruct the formation of an image can be created after adding a predetermined image such as a tint block pattern, and the created job can be transmitted to an image forming apparatus, such as a printer, a copying machine and a digital multi-function printer, so as to execute print processing.

An image processing apparatus according to the present invention is characterized in that the created job is transmitted to a predetermined recipient.

According to the present invention, the created job is transmitted to a predetermined recipient. It is thus possible to transmit a job created after adding a predetermined image, such as a tint block pattern, to a predetermined image forming apparatus, such as a printer, a copying machine and a digital multi-function printer, and execute print processing.

An image processing apparatus according to the present invention is characterized by comprising a data accepting unit for accepting image data to be stored in the storage unit, wherein the accepted image data is stored in the storage unit.

According to the present invention, the image processing apparatus accepts image data to be stored in the storage unit, and stores the accepted image data in the storage unit as image data to be composited. It is therefore possible to store any image desired by the user and add the image when executing print processing.

An image processing apparatus according to the present invention is characterized in that the image data stored in the storage unit contains information indicating that copying of the image is prohibited.

According to the present invention, since the image data to be composited onto the received image data contains information indicating that copying of the image is prohibited, it is possible to effectively restrain copying of printed matter that was produced based on composite image data.

An image forming apparatus according to the present invention is an image forming apparatus for reading an image of a document and forming an image on a sheet based on image data obtained by reading the document, and characterized by comprising: a storage unit for storing predetermined image data; and means for compositing the image data stored in the storage unit onto image data obtained by reading an image of a document, wherein image formation is performed based on the image data obtained by compositing.

According to the present invention, a predetermined image pre-stored in the storage unit is composited onto image data obtained by reading an image of a document, and an image is formed on a sheet based on the image data obtained by compositing. Therefore, even when making a copy of a document using a copying machine comprising image reading means and image forming means, it is possible to produce printed matter including an added tint block pattern.

A memory product according to the present invention is a computer readable memory product, and characterized by storing a computer program capable of causing a computer to perform a step of detecting whether or not there is image data stored in first storage unit and a step of compositing image data pre-stored in second storage unit onto image data detected at the detection step, when the program is read and executed by the computer.

According to the present invention, the computer is caused to detect whether or not there is image data stored in the first storage unit, and if there is image data stored in the first storage unit, the computer is caused to composite image data pre-stored in the second storage unit onto the image data. Therefore, even if many pieces of image data for printing are present, it is possible to temporarily store these image data in the first storage unit and composite predetermined image data onto the image data, and consequently the image data compositing process can be executed without decreasing processing efficiency.

The above and further objects and features of the invention will more fully be apparent from the following detailed description with accompanying drawings.

BRIEF DESCRIPTION OF THE SEVERAL VIEWS OF THE DRAWINGS

FIG. 16A and FIG. 16B are schematic views showing one example of a copy setting screen.

DETAILED DESCRIPTION OF THE INVENTION

The following description will specifically explain the present invention, based on the drawings illustrating some embodiments thereof.

Embodiment 1

Figure 1:
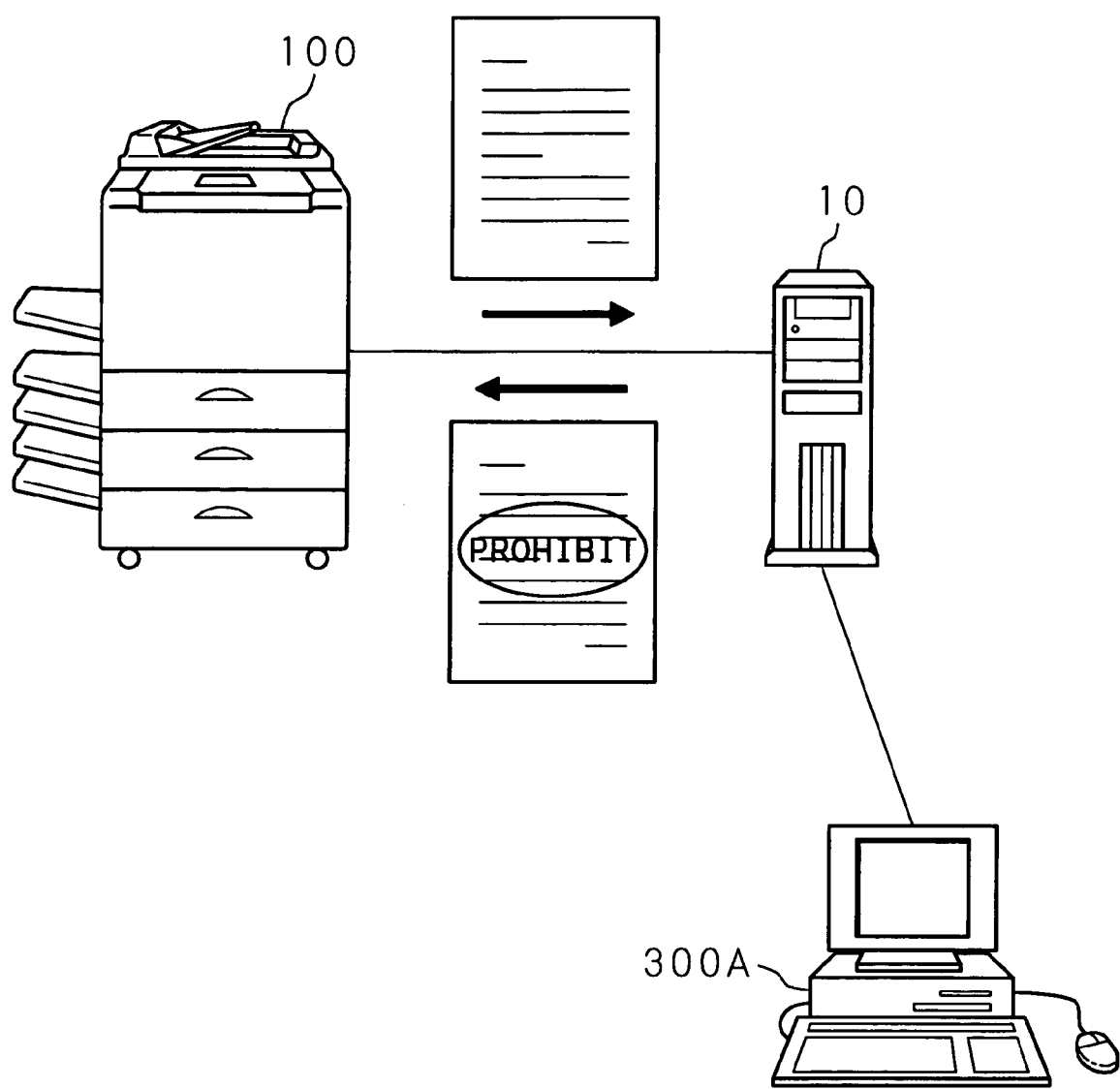
FIG. 1 is a schematic view showing the entire structure of an image forming system according to an embodiment.

FIG. 1 is a schematic view showing the entire structure of an image forming system according to this embodiment. In FIG. 1, the reference numeral 100 represents a multi-function printer with the function of reading an image of a document (scanner function), the function of forming the read image on a sheet of paper, OHP film, etc. (copy function), and the function of transmitting image data obtained by reading the image of the document to an external device (network scanner function), and this multi-function printer 100 is connected to a server 10 through a communication cable. The server 10 stores an image for prohibiting or restricting copying (hereinafter referred to as a restraining image) as tint block data in a HDD device (see FIG. 3) in advance, and functions as an image transmitting apparatus that adds a restraining image to print data transmitted from the multi-function printer 100 and transmits the resulting data to the multi-function printer 100. On the other hand, the multi-function printer 100 functions as an image forming apparatus that executes print processing based on print data with an added restraining image.

Moreover, an information processing apparatus 300A such as a personal computer is connected to the server 10, and editing, deletion or addition of tint block data pre-stored in the server 10 can be performed through the information processing apparatus 300A.

Figure 2A:
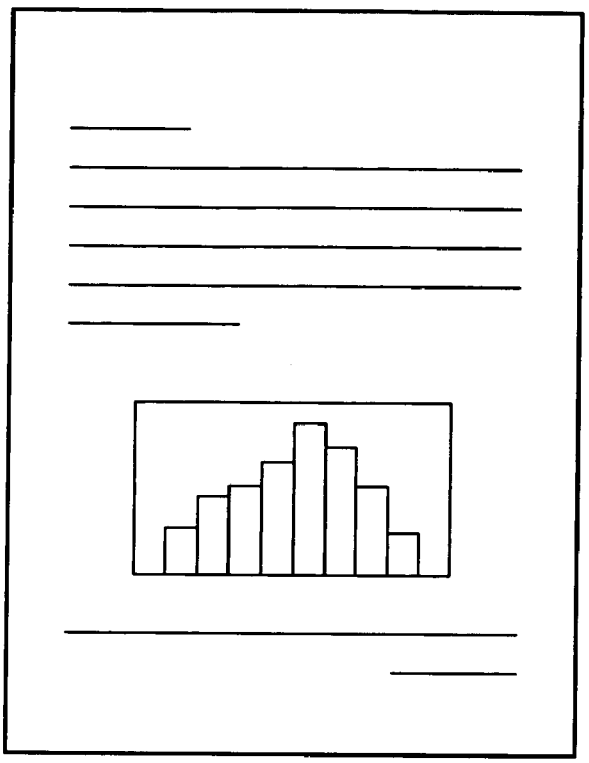
FIG. 2A and FIG. 2B are schematic views for explaining an image to be produced by a server.
Figure 2B:
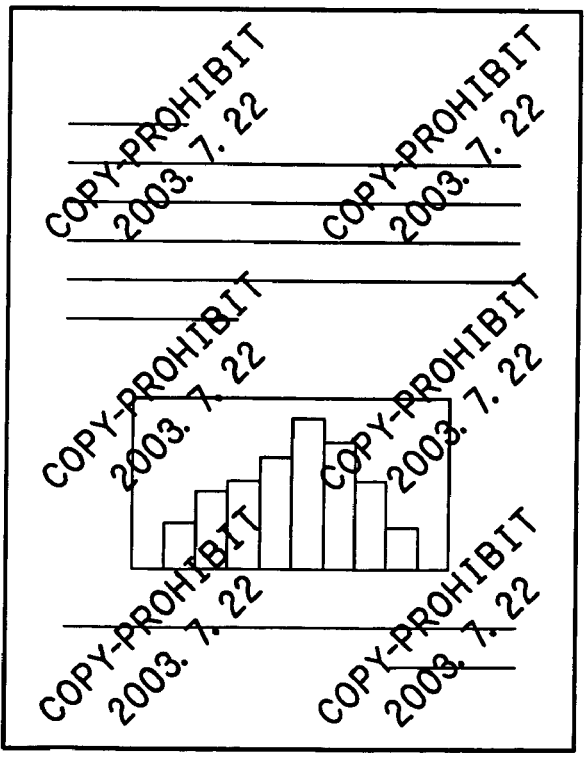

FIG. 2A and FIG. 2B are schematic views for explaining an image to be produced by the server 10. A document to be read by the multi-function printer 100 is composed of sentences, table, etc. formed on paper (see FIG. 2A), and the multi-function printer 100 optically reads such a document, coverts it into electronic data, adds information necessary for printing, such as a print size and density, to the electronic data, and transmits the resulting data as print data to the server 10. In the server 10 that has received the print data from the multi-function printer 100, the pre-stored tint block data is composited onto the image data contained in the print data. The tint block data is composed of tint block patterns including characters and patterns for prohibiting or restricting copying of printed matter as hidden characters and hidden patterns. More specifically, the hidden characters and hidden patterns are composed of foreground dots in a size that remain when a copy is made using a copying machine, and the background is composed of minute background dots arranged so that the hidden characters and hidden patterns are not noticeable. Therefore, when printing is performed on paper based on print data to which a restraining image was added by the server 10, the resulting printed matter does not seem to be much different from the original document in appearance, but the hidden characters and hidden patterns added as the restraining image appear as shown in FIG. 2B when the printed matter with the added restraining image is copied by a copying machine or the like.

Figure 3:
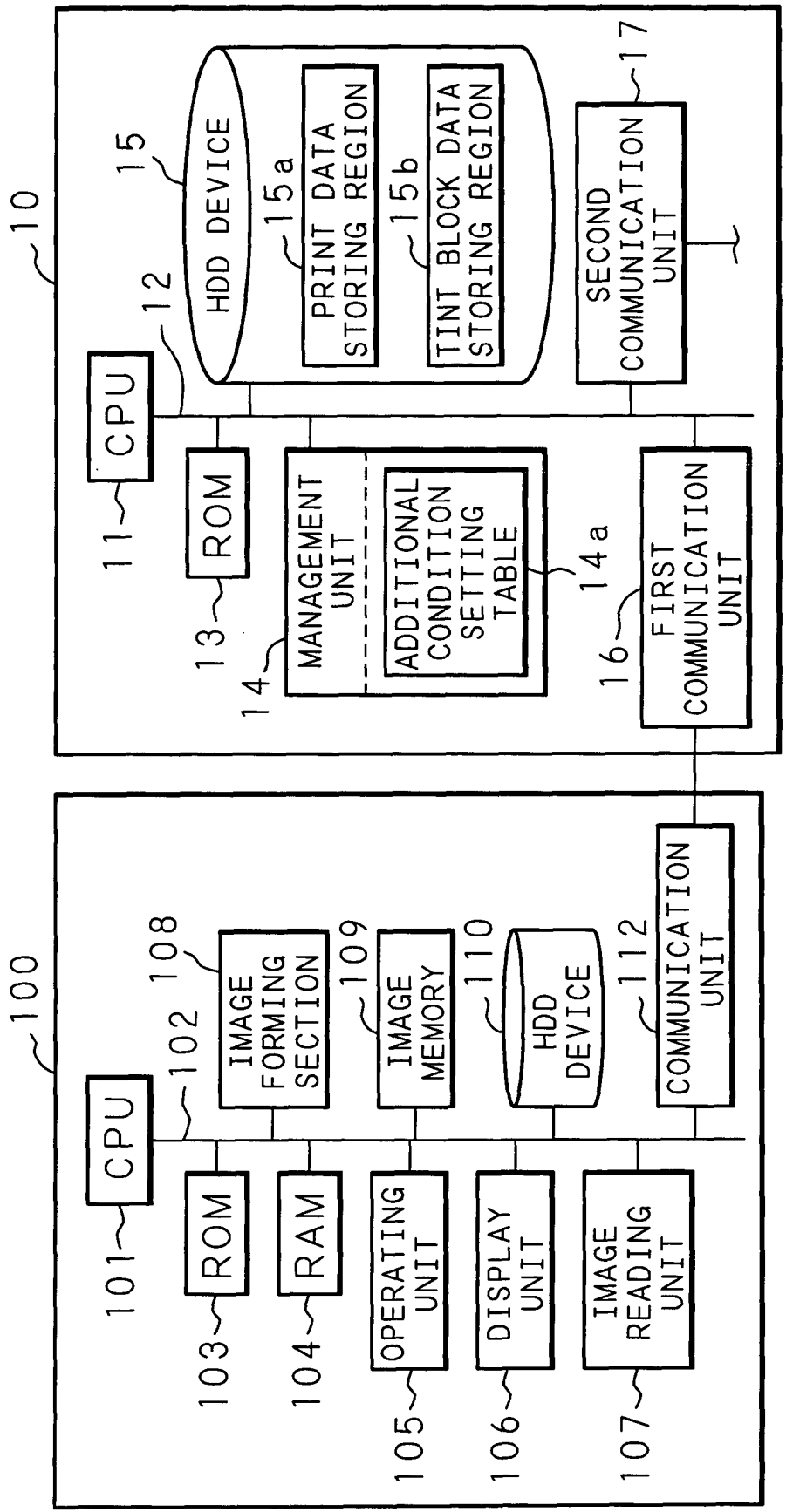
FIG. 3 is a block diagram for explaining the internal structures of a multi-function printer and a server.

FIG. 3 is a block diagram for explaining the internal structures of the multi-function printer 100 and the server 10. The multi-function printer 100 comprises a CPU 101. When the CPU 101 reads and executes a control program pre-stored in the ROM 103, it controls various hardware devices connected through a bus 102 and causes them to operate as the multi-function printer 100 for executing the above-mentioned processing as a whole. A RAM 104 temporarily stores data generated during the execution of the control program, and various data received from an external device.

An operating unit 105 has various hardware keys, and receives instructions from a user, such as setting values for the number of copies, the copy density, the recipient of print data, etc., an instruction to switch functions, and an instruction to start outputting. A display unit 106 has a liquid crystal display, and displays the operating state of the multi-function printer 100, various setting values inputted through the operating unit 105, and information to be given to the user. Moreover, a part of the display unit 106 has touch-panel type software keys constructed to receive the above-mentioned setting operations.

An image reading unit 107 comprises a light source for irradiating light on a document to be read, an image sensor such as a CCD (Charge Coupled Device), and an AD converter (not shown). The image reading unit 107 focuses an image of a document set on a predetermined read position onto the image sensor, converts the image into an analog electric signal, and converts the converted analog signal into a digital signal by the AD converter. Then, the image reading unit 107 generates digital image data by correcting the luminous intensity distribution characteristic of the light source when reading the document, the variation in the sensitivity of the image sensor, etc. for the digital signals obtained by the AD conversion.

An image forming section 108 comprises, for example, a charger for charging a photosensitive drum to a predetermined electric potential; a laser write device for generating an electrostatic latent image on the photosensitive drum by emitting laser light according to the image data received from an external device; a developing device for developing an image by supplying toner to the electrostatic latent image formed on the photosensitive drum surface; and a transfer device (not shown) for transferring the toner image formed on the photosensitive drum surface to a sheet of paper, OHP film, or the like. The image forming section 108 can form an image desired by the user on paper by using an electrophotographic technique.

In this embodiment, although the image forming section 108 performs image formation with the electrophotographic technique using the laser write device, it is, of course, possible to perform image formation by using an ink jet technique, a heat transfer technique, or a sublimation technique.

An image memory 109 is composed of a semiconductor memory, and temporarily stores image data generated by reading an image of a document by the image reading unit 107, and image data developed from print data received through a communication unit 112. According to an instruction from the CPU 101, the image data stored temporarily in the image memory 109 is transmitted to a transfer location corresponding to the purpose of use. In short, when forming an image on paper, the image data is transferred to the image forming section 108; and when saving the image data as electronic data, it is transferred to a HDD device 110.

The HDD device 110 is a magnetic recording medium in the shape of a disk, and a part of its storing region is used as a data storing region for storing image data obtained by the image reading unit 107. When a request is received through the operating unit 105, the image data stored in the data storing region is read. Thus, if there is a need to execute the print processing again due to failure of printing or a shortage of the number of copies outputted, print processing can be executed by arbitrarily reading the image data stored in the data storing region.

The communication unit 112 has a communication interface according to predetermined communication standards, transmits print data generated based on the image data obtained by the image reading unit 107 to the server 10 connected to the communication unit 112 through a communication cable, and receives print data with a restraining image added by the server 10.

Figure 4:
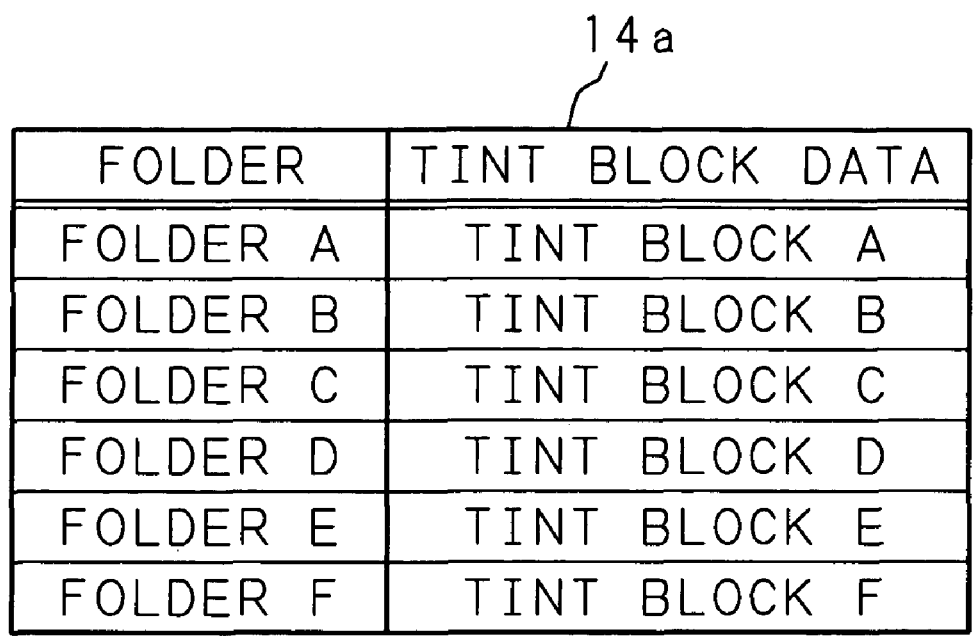
FIG. 4 is a concept view showing one example of an additional condition setting table.

The server 10 comprises a CPU 11. When the CPU 11 reads and executes a control program pre-stored in a ROM 13, it controls various hardware devices connected through a bus 12 and causes them to operate as the server 10 for executing the above-mentioned processing as a whole. A first communication unit 16 has a communication interface for connecting the multi-function printer 100 through a communication cable, receives print data transmitted from the multi-function printer 100, and transmits the print data with an added restraining image to the multi-function printer 100. The first communication unit 16 controls such transmission and reception of data. A HDD device 15 is a magnetic recording medium in the shape of a disk, and a part of its storing region is used as a print data storing region 15a for storing print data received through the first communication unit 16, and a tint block data storing region 15b for storing tint block data to be added as a restraining image. The print data storing region 15a is a region for storing print data by sorting the print data according to each folder created by the user, and makes it possible to add a different kind of restraining image to each folder. Accordingly, a management unit 14 composed of a semiconductor memory has an additional condition setting table 14a in which conditions for adding restraining images are set. FIG. 4 is a concept view showing one example of the additional condition setting table 14a. In the additional condition setting table 14a, the folders created in the print data storing region 15a and corresponding tint block data to be added to the respective folders are specified. As to be described later, a different restraining image can be added by selecting a folder of a recipient through the multi-function printer 100.

In addition, the information processing apparatus 300A is connected to a second communication unit 17 through a communication cable. The second communication unit 17 receives operating instructions and tint block data to be registered in the tint block data storing region 15b from the information processing apparatus 300A, and registers the received tint block data in the tint block data storing region 15b.

Figure 5:
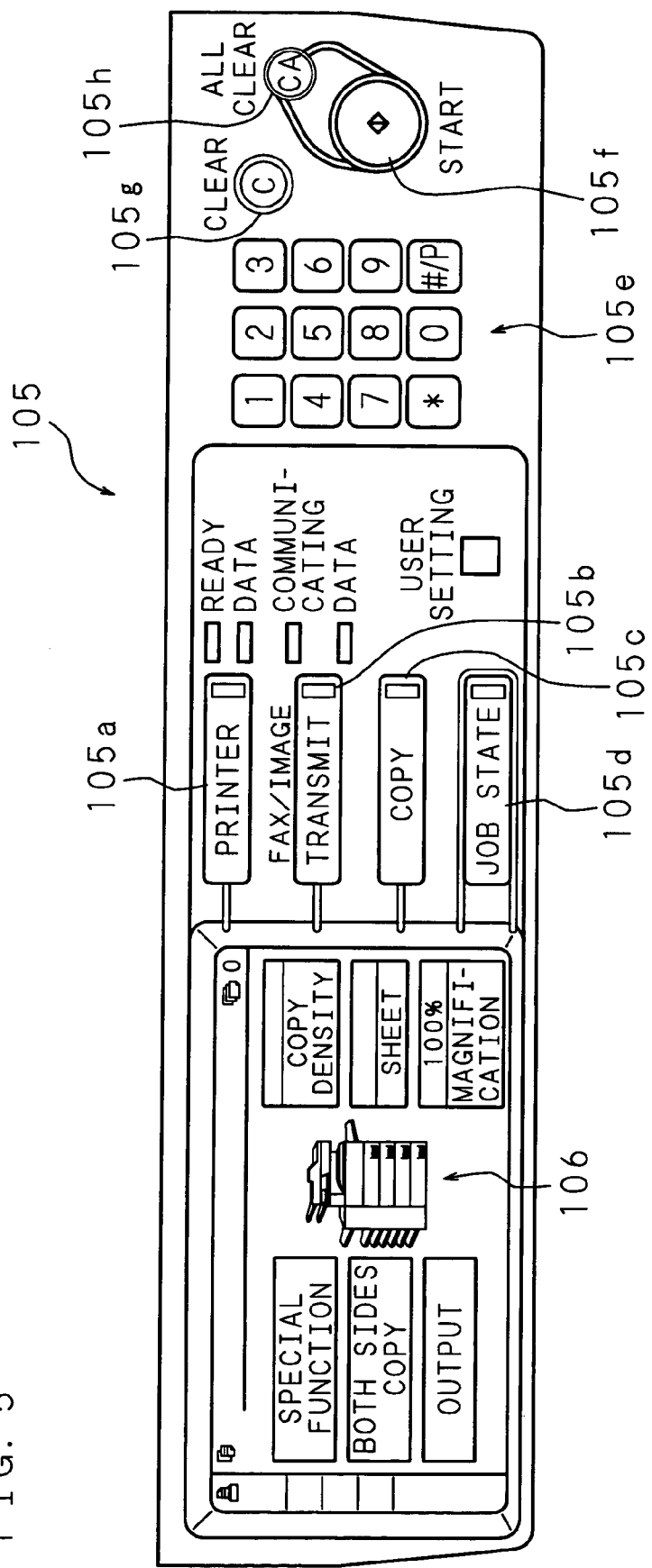
FIG. 5 is a schematic view showing one example of the operating unit and display unit of the multi-function printer.

FIG. 5 is a schematic view showing one example of the operating unit 105 and display unit 106 of the multi-function printer 100. In order to receive operating instructions from the user, the operating unit 105 has hardware keys, such as function switching keys 105a through 105d for switching a plurality of functions of the multi-function printer 100, ten keys 105e for inputting numerical values, Start key 105f for starting to read a document, Clear key 105g for correcting the inputted information, and All Clear key 105h for clearing the set contents entirely. The display unit 106 is composed of a liquid crystal display device, and displays information inputted through the operating unit 105 and information to be given to the user. Moreover, a part of the display unit 106 comprises touch-panel type software keys so as to receive operating instructions from the user while displaying various guide screens.

Figure 6A:
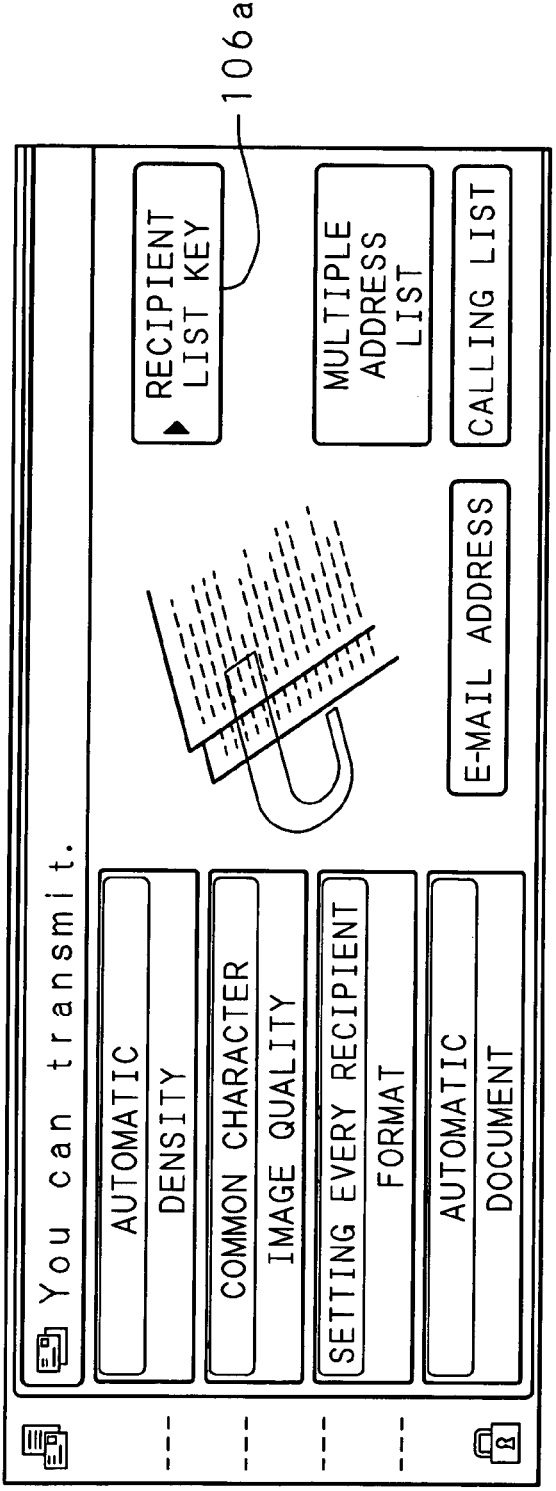
FIG. 6A and FIG. 6B are schematic views showing one example of screen displayed on the display unit when transmitting print data from the multi-function printer.
Figure 6B:
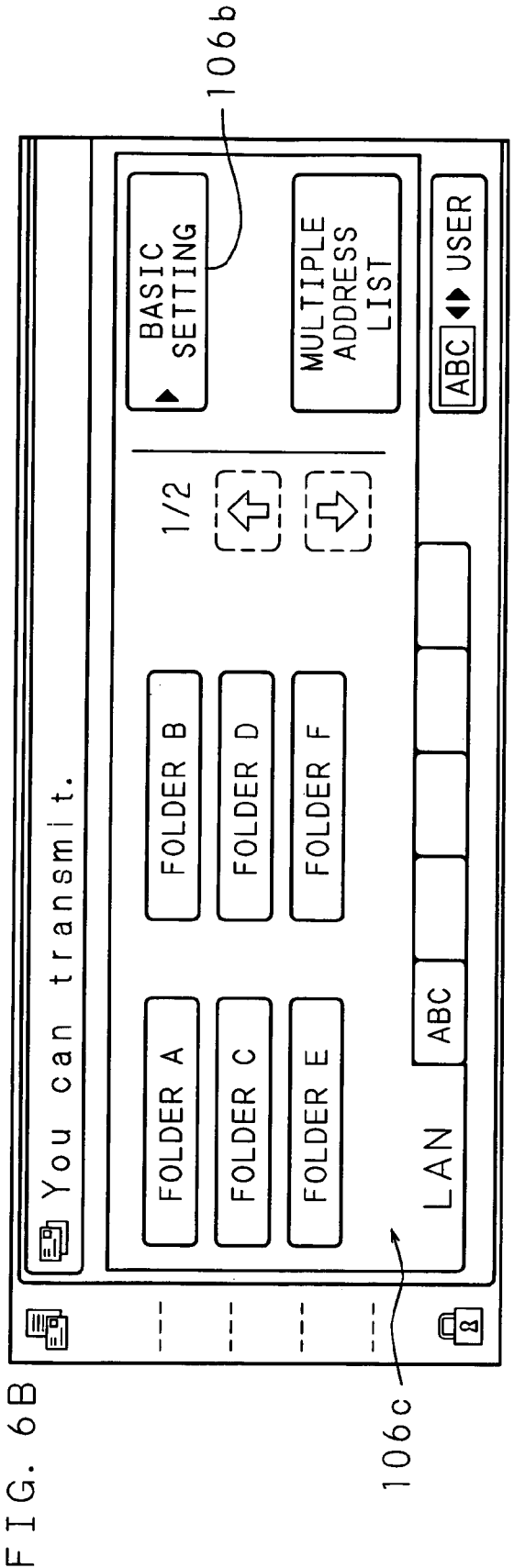

FIG. 6A and FIG. 6B are schematic views showing examples of screen displayed on the display unit 106 when transmitting print data from the multi-function printer 100. In the operating unit 105, when the function switching key 105b for switching to the print data transmission function is pressed, as shown in FIG. 6A, a transmission setting screen for receiving various settings for the transmission of print data is displayed on the display unit 106. The transmission setting screen includes software keys for receiving density and image quality settings, etc. for printing, and a software key (recipient list key 106a) for setting a recipient of print data. When the recipient list key 106a is pressed on the transmission setting screen, as shown in FIG. 6B, a recipient specifying screen for receiving the setting of the recipient of print data is displayed on the display unit 106. In order to specify one folder from a plurality of folders created in the print data storing region 15a of the server 10 as the recipient of print data, the recipient specifying screen shown in FIG. 6B has folder specifying keys 106c corresponding to the respective folders. Moreover, when a basic setting key 106b is pressed, the process of returning the display to the transmission setting screen is performed.

Figure 7:
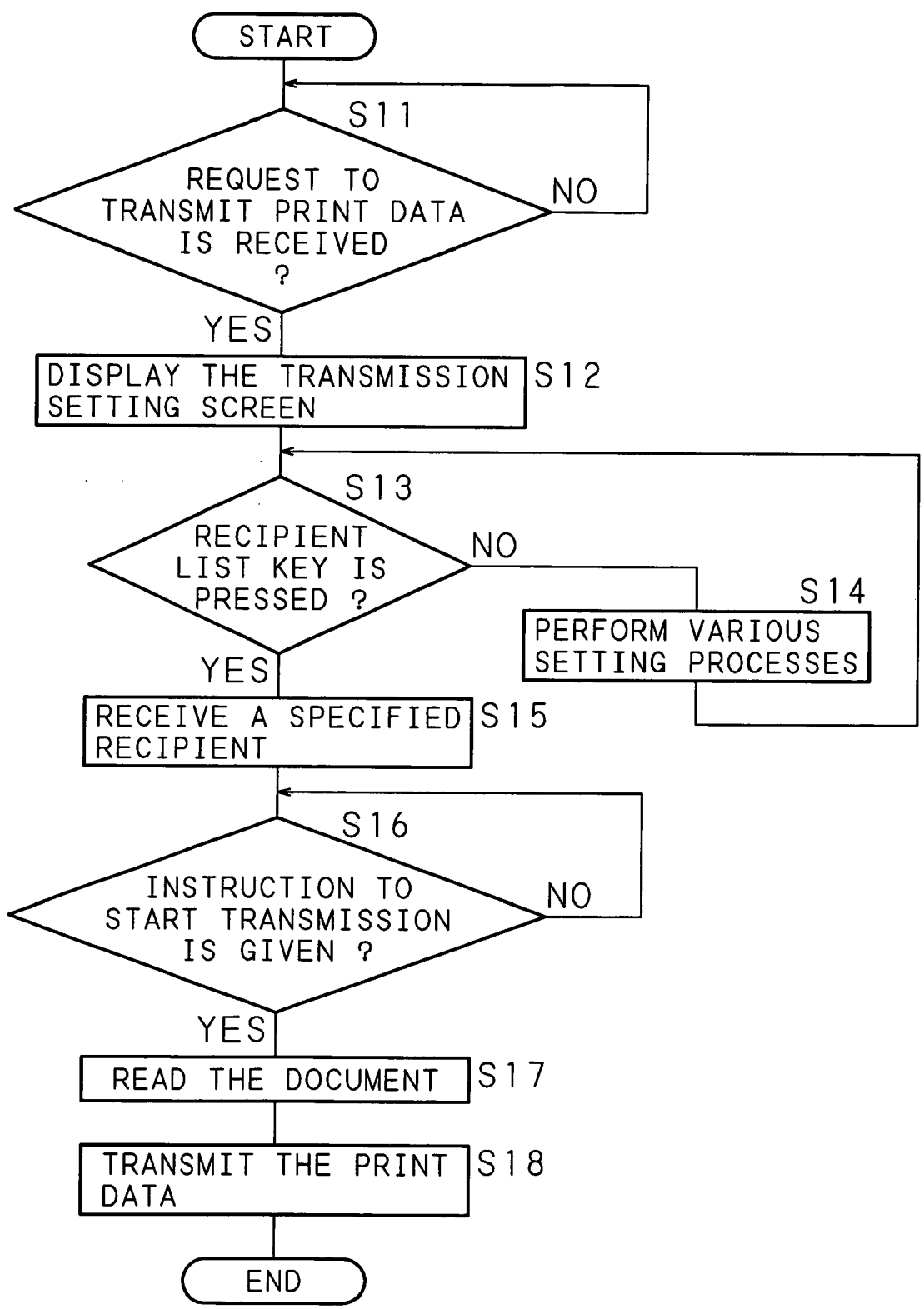
FIG. 7 is a flowchart for explaining the processing steps executed on the multi-function printer side.

FIG. 7 is a flowchart for explaining the processing steps to be executed by the multi-function printer 100. First, the CPU 101 of the multi-function printer 100 monitors whether or not the function switching key 105b representing print data transmission is pressed, so as to judge whether or not a request to transmit print data is received (step S11). If the CPU 101 judges that a request to transmit print data is not received (step S11: NO), the CPU 101 waits until a request to transmit print data is received.

If the CPU 101 judges that the function switching key 105b of the operating unit 105 is pressed and a request to transmit print data is received (step S11: YES), the transmission setting screen as shown in FIG. 6A is displayed on the display unit 106 (step S12). Then, the CPU 101 judges whether or not the recipient list key 106a provided in the transmission setting screen is pressed (turned on) (step S13). If the CPU 101 judges that the recipient list key 106a is not pressed (step S13: NO), it performs various setting processes for the density, image quality, etc. for printing (step S14), and returns the processing to step S13.

On the other hand, if the CPU 101 judges that the recipient list key 106a is pressed (step S13: YES), it displays the recipient specifying screen as shown in FIG. 6B on the display unit 106, and receives a specified recipient (step S15). Then, the CPU 101 judges whether or not the Start key 105f in the operating unit 105 is pressed, and thereby judges whether or not an instruction to start transmission is given (step S16). If the CPU 101 judges that an instruction to start transmission is not given (step S16: NO), it waits until an instruction to start transmission is given. Then, if the CPU 101 judges that an instruction to start transmission is given (step S16: YES), it controls the image reading unit 107 to read the document (step S17), creates print data based on the image data obtained by the image reading unit 107, and performs the transmission process of transmitting the generated print data to the server 10 (step S18).

Figure 8:
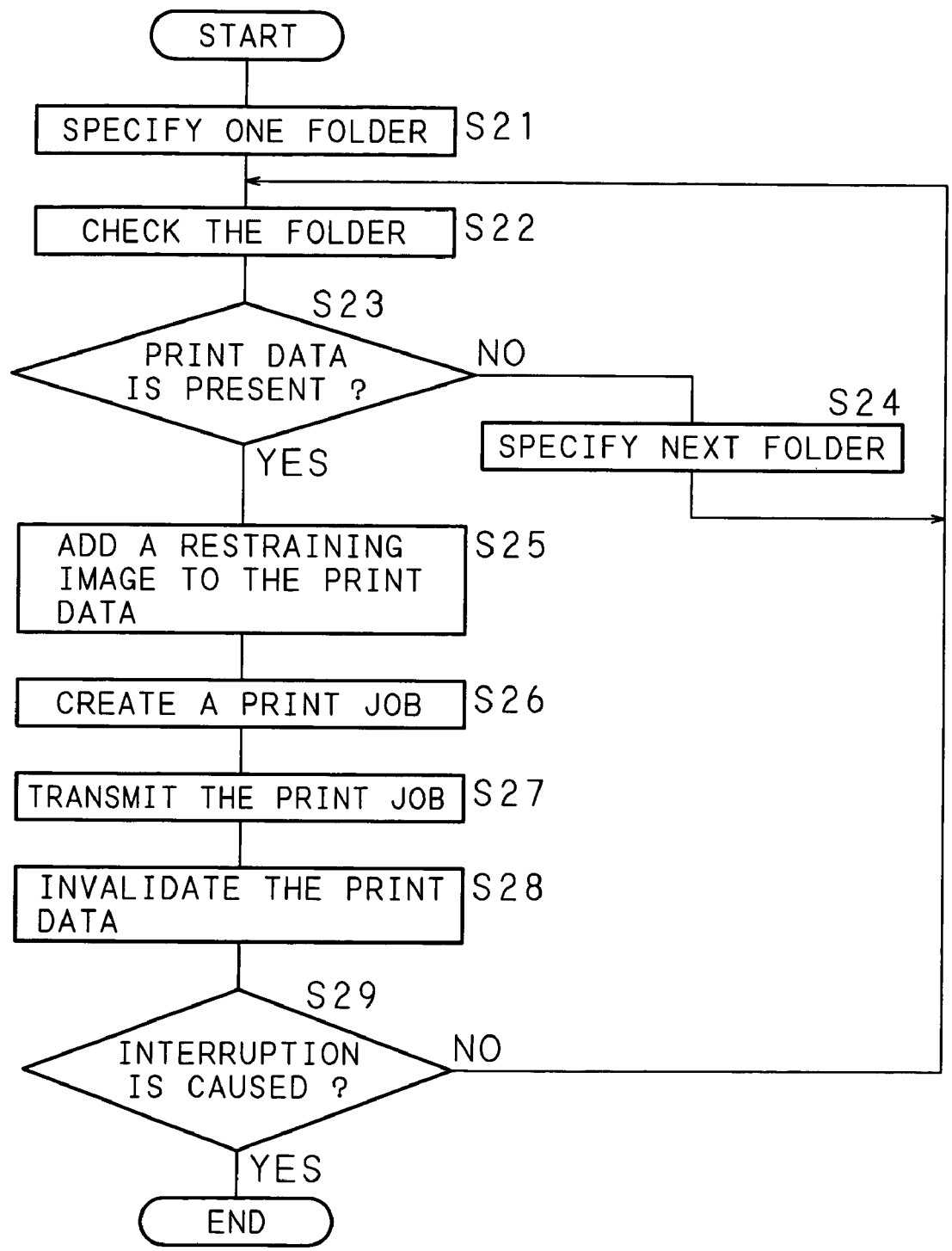
FIG. 8 is a flowchart for explaining the processing steps executed on the server side.

FIG. 8 is a flowchart for explaining the processing steps executed by the server 10. The CPU 11 of the server 10 specifies one folder (for example, "Folder A") from a plurality of folders created in the print data storing region 15a (step S21), checks the inside of the specified folder (step S22), and judges whether or not print data is present in the folder (step S23). If the CPU 11 judges that print data is not present in the folder (step S23: NO), it specifies the next folder (for example, "Folder B") (step S24) and returns the processing to step S22.

If the CPU 11 judges that print data is present in the specified folder (step S23: YES), it selects the tint block data corresponding to the folder with reference to the additional condition setting table 14a, and reads the selected tint block data from the tint block storing region 15b of the HDD device 15. Then, the CPU 11 adds the tint block data as a restraining image to the print data read from the specified folder (step S25). More specifically, the CPU 11 performs the process of compositing the image data developed from the print data and the tint block data read from the tint block storing region 15b. Next, the CPU 11 creates a print job for instructing the multi-function printer 100 to perform print processing based on the print data with the added restraining image (step S26), and transmits the created print job to the multi-function printer 100 through the first communication unit 16 (step S27), so as to produce printed matter with the added restraining image.

After transmitting the print job to the multi-function printer 100, the server 10 invalidates the transmitted print data (step S28). Here, the invalidation of print data means deleting the print data by writing zero or random data on bits that store the data, so as to make it difficult to reproduce the data. Next, the CPU 11 judges whether or not an interruption is caused by an instruction to reset the entire system of the server 10 or turn off the power (step S29). If the CPU 11 judges that no interruption is caused (step S29: NO), it returns the processing to step S22, and performs the processing on the remaining print data in the same manner as above. If the CPU 11 judges that an interruption is caused (step S29: YES), it finishes the processing of this routine.

In this embodiment, the multi-function printer 100 and the server 10 are connected to each other with a communication cable and the transmission and reception of print data are performed by communication, but if the communication unit 112 of the multi-function printer 100 has a SCSI port or a USB port, it may also be possible to connect the server 10 as an external device to such a port.

Embodiment 2

In Embodiment 1, the multi-function printer 100 transmits print data to the server 10, and the server 10 adds a restraining image to the print data and then sends the print data back to the multi-function printer 100 so as to produce printed matter with the added the restraining image, but the sender of the print data and the apparatus that executes the print processing based on the print data with the added restraining image may be different apparatuses. Embodiment 2 illustrates a structure in which printed matter with an added restraining image is produced by transmitting print data generated by an image transmitting apparatus, such as a scanner and a personal computer, to a server as a relay device, generating print data to which the restraining image is added by the server, and transmitting the generated print data to an image forming apparatus such as a printer and a multi-function printer.

Figure 9:
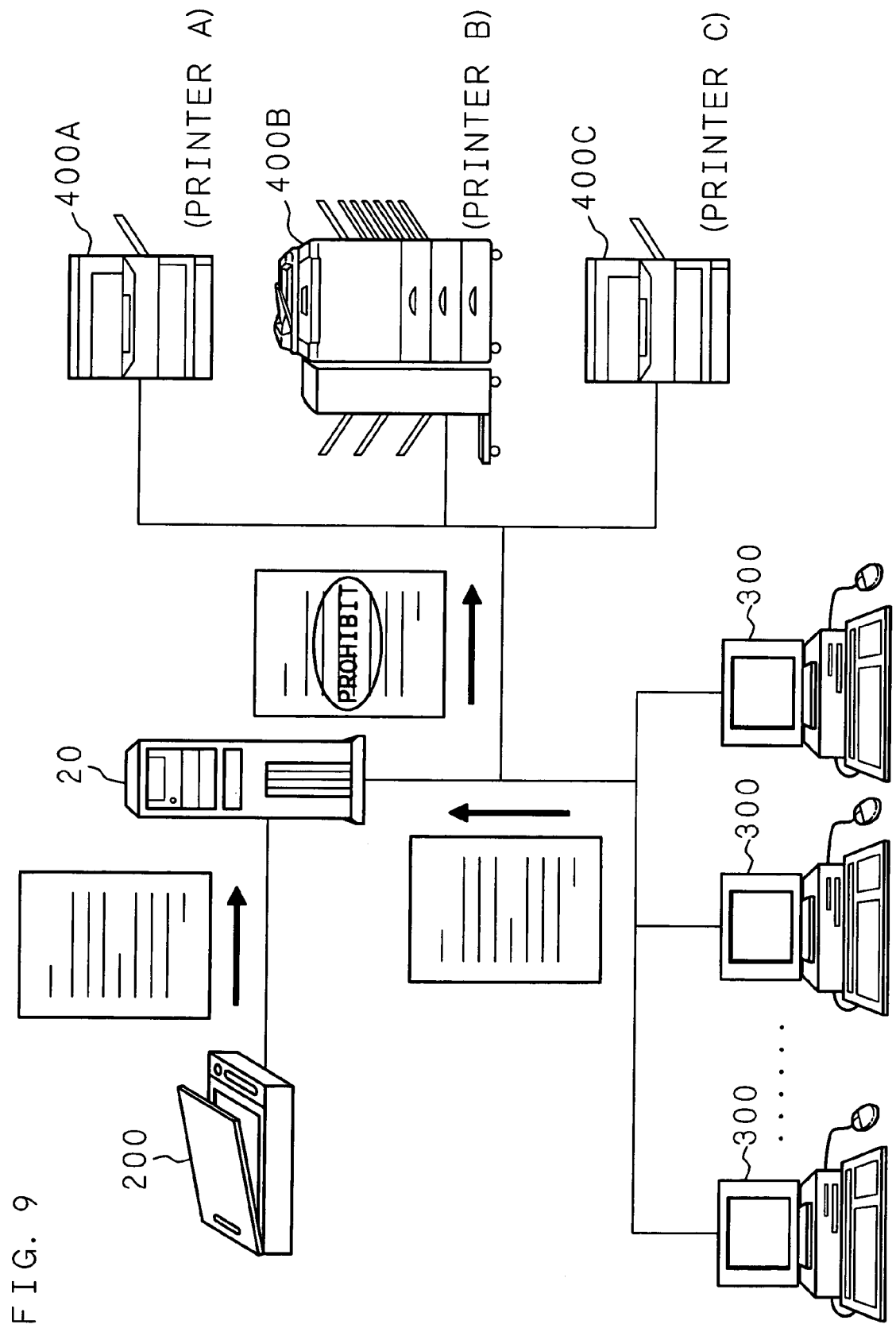
FIG. 9 is a schematic view showing the entire structure of an image forming system according to an embodiment.

FIG. 9 is a schematic view showing the entire structure of an image forming system according to this embodiment. In FIG. 9, the reference numeral 20 represents a server having the function of adding a restraining image to print data received from an external device. Connected to the server 20 are a scanner 200 to be a sender of print data, information processing apparatuses 300, 300, ..., 300 such as personal computers, and printers 400A, 400B and 400C to be recipients of print data with an added restraining image.

Figure 10A:
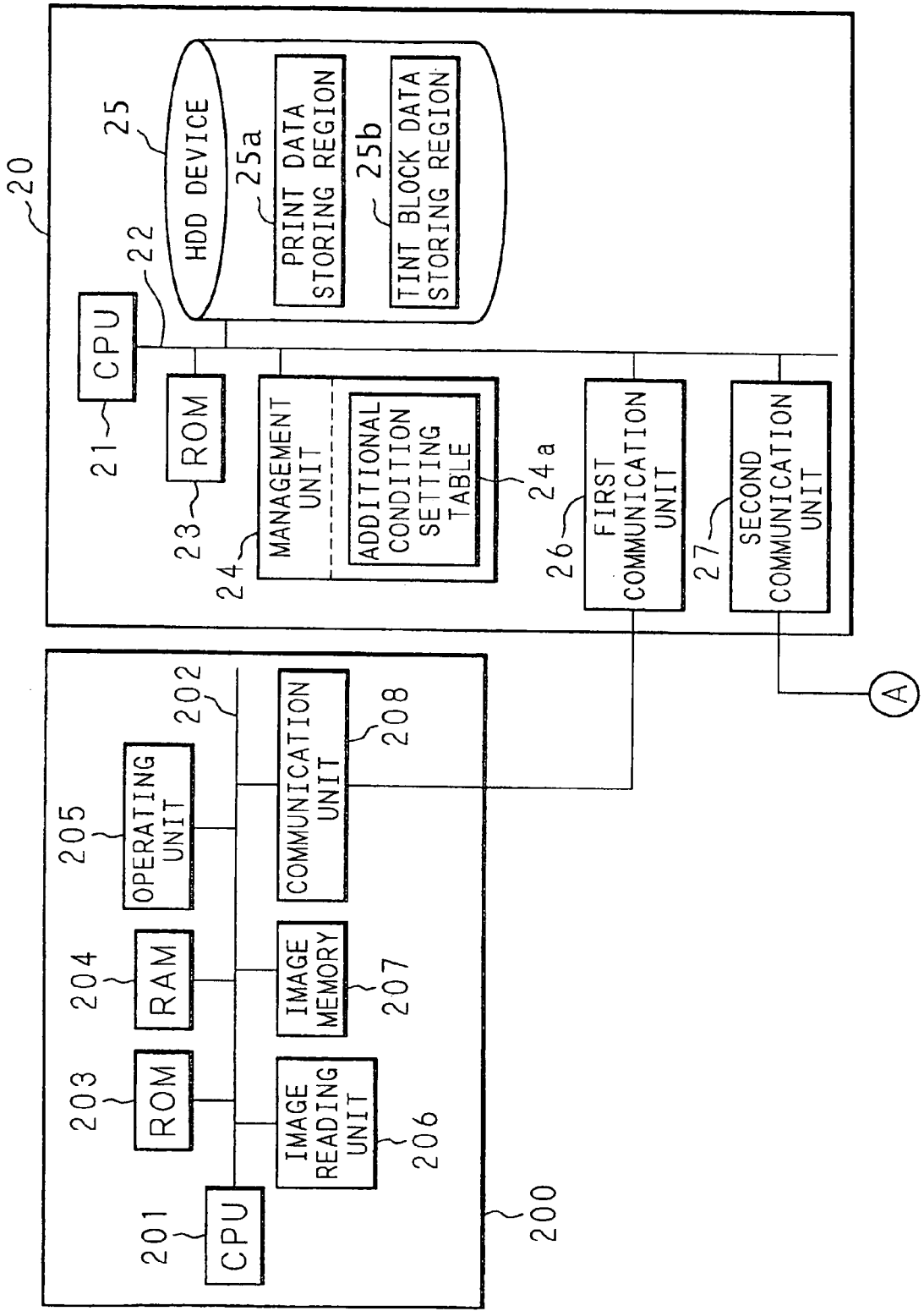
FIG. 10A and FIG. 10B are block diagrams for explaining the internal structures of a server, a scanner, an information processing apparatus, and a printer.
Figure 10B:
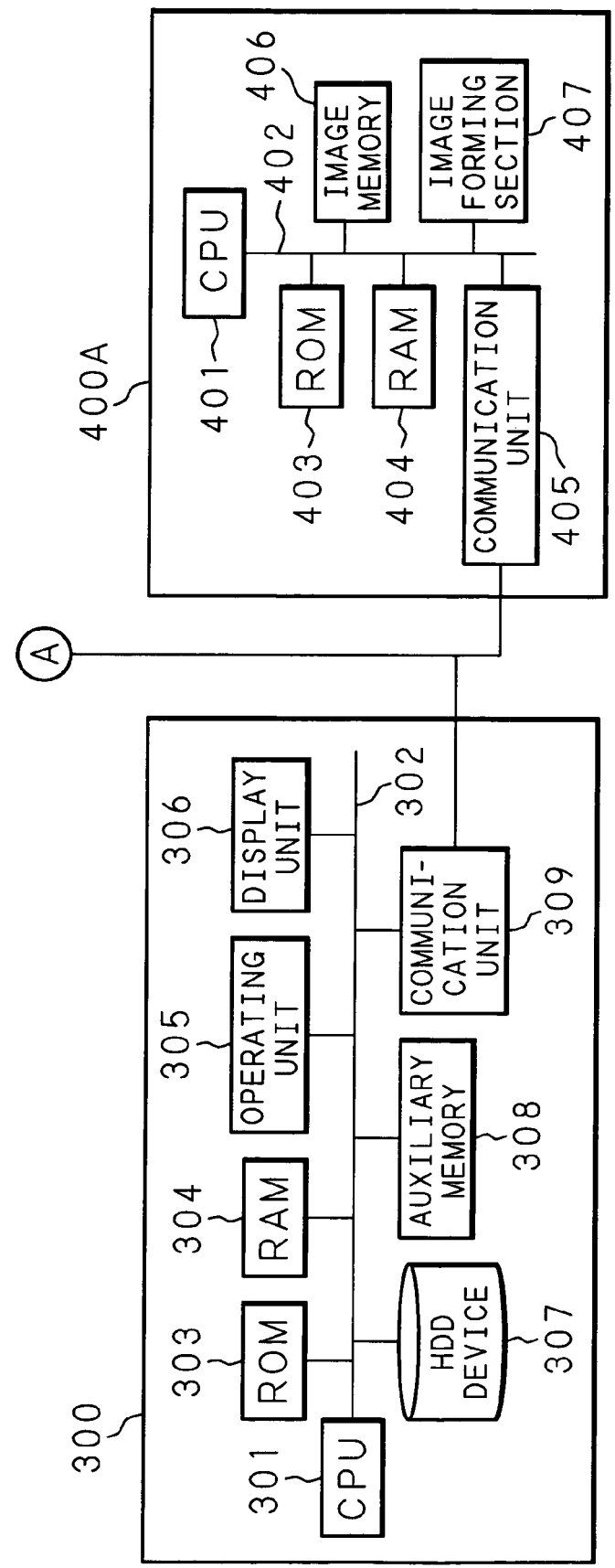

FIG. 10A and FIG. 10B are block diagrams for explaining the internal structures of the server 20, scanner 200, information processing apparatus 300, and printer 400A. The scanner 200 comprises a CPU 201, and various hardware devices, such as a ROM 203, a RAM 204, an operating unit 205, an image reading unit 206, an image memory 207 and a communication unit 208, connected to the CPU 201 through a bus 202. The image reading unit 206 of the scanner 200 comprises a light source for irradiating light on a document to be read, an image sensor such as a CCD (Charge Coupled Device), and an AD converter (not shown). After temporarily storing image data obtained by the image reading unit 206 in the image memory 207, the scanner 200 transmits the image data to the server 20 through the communication unit 208. The communication unit 208 is a communication interface for connecting a communication cable such as a SCSI cable and a USB cable, for example, and enables the transmission of image data (print data) to the server 20 through the communication cable.

The information processing apparatus 300 comprises a CPU 301. A ROM 303, a RAM 304, an operating unit 305, a display unit 306, a HDD device 307, an auxiliary memory 308, and a communication unit 309 are connected to the CPU 301 through a bus 302. In the HDD device 307, application programs for creating document data and graphics data, and a printer driver for using the printer 400A (400B, 400C) via the server 20 are installed. The created document data and graphics data can be transmitted as print data to the server 20 by calling the printer driver from the respective application programs. The communication unit 309 is a communication interface according to a TCP/IP protocol, for example, and connected to a second communication unit 27 of the server 20 through a communication cable.

The server 20 comprises a CPU 21. A ROM 23, a management unit 24, a HDD device 25, a first communication unit 26, and a second communication unit 27 are connected to the CPU 21 through a bus 22. A control program for controlling various hardware devices connected to the bus 22 is stored in the ROM 23 in advance. When the CPU 21 reads and executes the control program, the server 20 functions as a relay device for adding tint block data to print data transmitted from the scanner 200 or the information processing apparatus 300, and for transmitting to the printer 400A (400B, 400C) a print job created by adding the tint block data. The HDD device 25 has a print data storing region 25a for storing print data transmitted from the scanner 200 or the information processing apparatus 300, and a tint block data storing region 25b for storing tint block data to be added to the print data. Note that a plurality of folders are created in the print data storing region 25a, and print data can be sorted and stored according to each folder.

Figure 11:
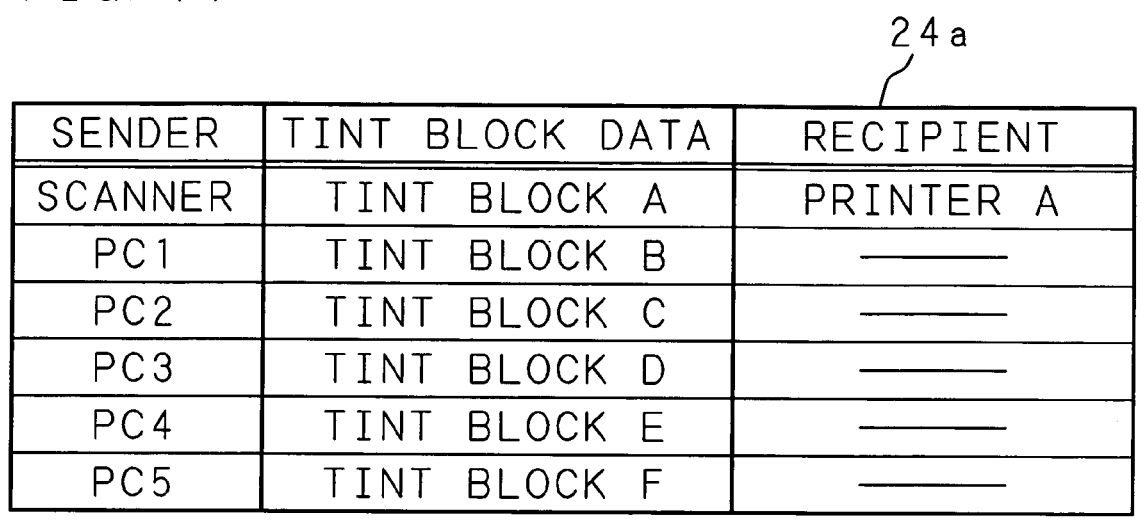
FIG. 11 is a concept view showing one example of a additional condition setting table.

In this embodiment, the tint block data to be added can be changed according to a sender of print data, and the management unit 24 composed of a semiconductor memory has an additional condition setting table 24a in which conditions for adding tint block data are set. FIG. 11 is a concept view showing one example of the additional condition setting table 24a, and the senders of print data, tint block data to be added to each sender, and the recipients of print data with the added tint block data are stored in association with each other. For example, if the sender of print data is a scanner (scanner 200), tint block data "Tint Block A" is selected as a restraining image to be added, the selected tint block data is retrieved from the tint block data storing region 25b and added to the print data, and then the resulting print data is transmitted to Printer A (printer 400A).

The printer 400A comprises a CPU 401, and various hardware devices, such as a ROM 403, a RAM 404, a communication unit 405, an image memory 406 and an image forming section 407, connected to the CPU 401 through a bus 402. The communication unit 405 is a communication interface according to a TCP/IP protocol, for example, and connected to the second communication unit 27 of the server 20 through a communication cable. Note that a LAN (Local Area Network) is constructed by mutually connecting the information processing apparatuses 300, 300, . . . , 300, the server 20 and the printers 400A, 400B and 400C through a hub (not shown). In the printer 400A, the print job transmitted from the server 20 is received by the communication unit 405, image data developed from the print job is temporarily stored in the image memory 406, and then the image data is transferred to the image forming section 407 so that an image with the added restraining image is formed on paper.

Since the internal structures of the printers 400B and 400C are the same as the internal structure of the printer 400A, the explanation thereof is omitted. Of course, it may also be possible to connect a multi-function printer having the scanner function, copy function and facsimile function as well as the printer function.

Figure 12:
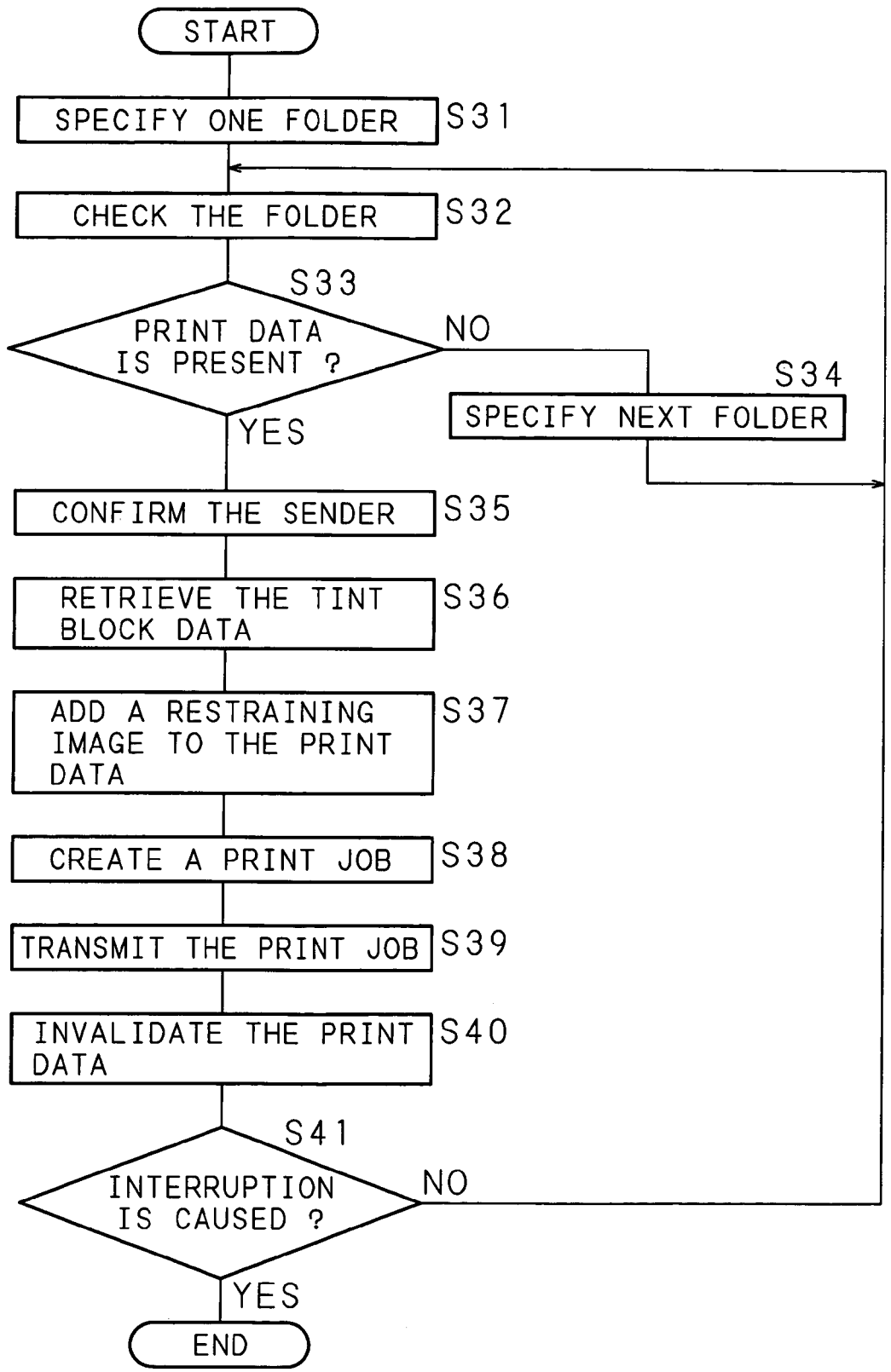
FIG. 12 is a flowchart for explaining the processing steps executed by the server.

FIG. 12 is a flowchart for explaining the processing steps executed by the server 20. The CPU 21 of the server 20 specifies one folder from a plurality of folders created in the print data storing region 25a (step S31), checks the inside of the specified folder (step S32), and judges whether or not print data is present in the folder (step S33). If the CPU 21 judges that print data is not present in the folder (step S33: NO), it specifies the next folder (step S34) and returns the processing to step S32.

If the CPU 21 judges that print data is present in the specified folder (step S33: YES), it confirms the sender of the print data with reference to the additional condition setting table 24a (step S35), and selects the corresponding tint block data. Then, the CPU 21 retrieves the selected tint block data from the tint block storing region 25b of the HDD device 25 (step S36), and adds the retrieved tint block data as a restraining image to the print data (step S37). More specifically, the CPU 21 performs the process of compositing the image data developed from the print data and the tint block data retrieved from the tint block storing region 25b. Next, the CPU 21 creates a print job for instructing print processing based on the print data with the added restraining image (step S38), and transmits the created print job to the printer 400A (400B, 400C) through the second communication unit 27 (step S39), so as to produce printed matter with the added restraining image.

After transmitting the print job to the printer 400A (400B, 400C), the server 20 invalidates the transmitted print data (step S40). Here, the invalidation of print data is carried out by writing zero or random data on the bits that store the data. Next, the CPU 21 judges whether or not an interruption is caused by an instruction to reset the entire system of the server 20 or turn off the power (step S41). If the CPU 21 judges that no interruption is caused (step S41: NO), it returns the processing to step S32 and performs the processing on the remaining print data in the same manner as above. If the CPU 21 judges that an interruption is caused (step S41: YES), it finishes the processing of this routine.

In this embodiment, tint block data to be added is selected according to the sender of print data. However, since the printer 400A (400B, 400c) to be a recipient can be specified by the printer driver when transmitting a print job from the information processing apparatus 300, it is of course possible to select tint block data to be added, according to the recipient specified by the information processing apparatus 300, by using the same technique as above.

Embodiment 3

In Embodiment 1, a restraining image is added to print data by the server 10 connected to the multi-function printer 100, and in Embodiment 2, a restraining image is added to print data by the server 20 connected to the scanner 200 and the information processing apparatus 300. However, a multi-function printer or a copying machine itself may have the function of adding a restraining image.

Figure 13:
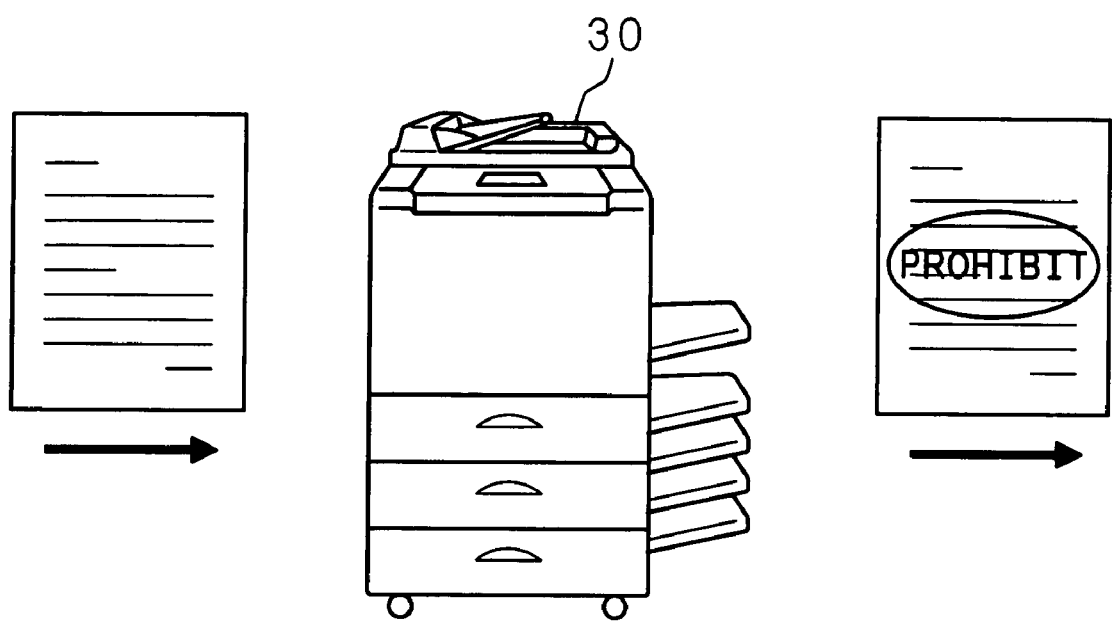
FIG. 13 is a schematic view showing a multi-function printer according to an embodiment.
Figure 14:
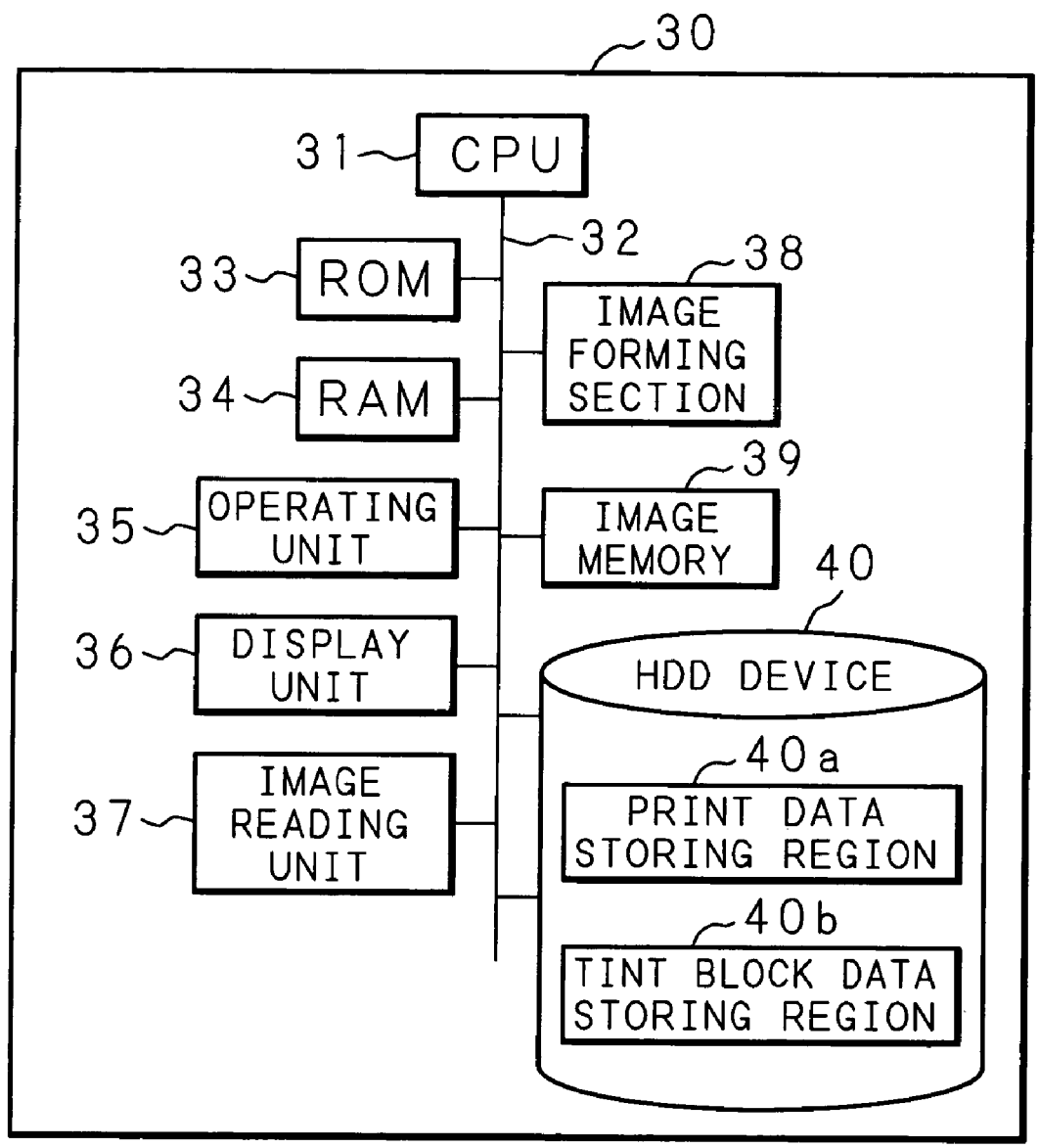
FIG. 14 is a block diagram for explaining the internal structure of the multi-function printer.

FIG. 13 is a schematic view showing a multi-function printer 30 according to Embodiment 3, and FIG. 14 is a block diagram for explaining the internal structure of the multi-function printer 30. The multi-function printer 30 comprises a CPU 31, and hardware devices, such as a ROM 33, a RAM 34, an operating unit 35, a display unit 36, an image reading unit 37, an image forming section 38, an image memory 39 and a HDD device 40, connected to the CPU 31 through a bus 32. By reading and executing a control program pre-stored in the ROM 33, the CPU 31 causes the multi-function printer 30 to operate as an image forming apparatus for performing the process of compositing tint block data and image data obtained by the image reading unit 37. Therefore, a part of the storing region of the HDD device 40 is used as a tint block data storing region 40b for storing a plurality of pieces of tint block data. When tint block data is selected through the operating unit 35 and display unit 36, the tint block data is read from the tint block data storing region 40b and composited onto image data for printing. Moreover, the HDD device 40 secures a print data storing region 40a in a part of the storing region so as to temporarily store the print data.

Figure 15:
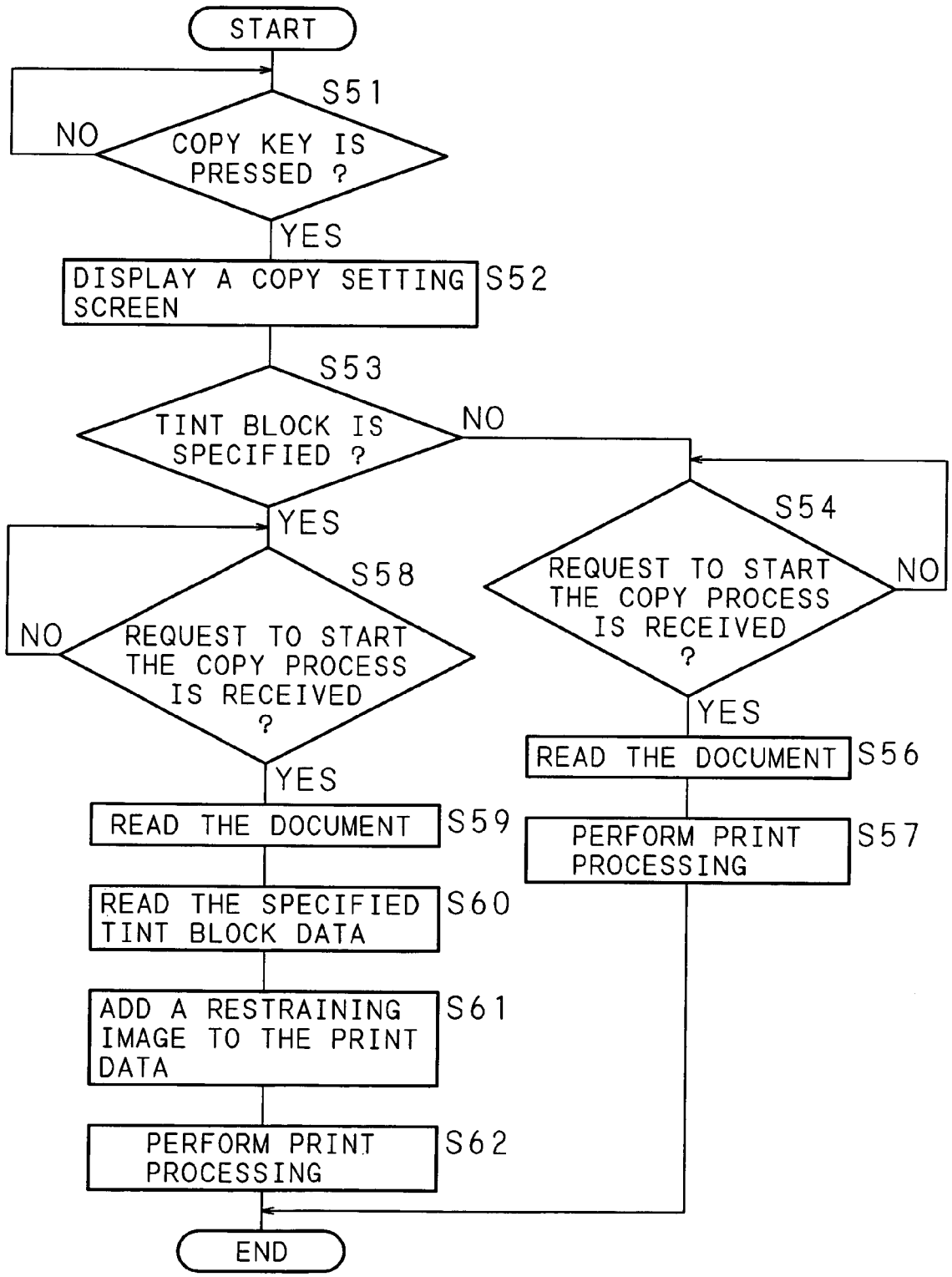
FIG. 15 is a flowchart for explaining the processing steps executed by the multi-function printer.

FIG. 15 is a flowchart for explaining the processing steps executed by the multi-function printer 30. First, the CPU 31 of the multi-function printer 30 judges whether or not the copy key (not shown) for switching to the copy mode is pressed through the operating unit 35 (step S51). If the CPU 31 judges that the copy key is not pressed (step S51: NO), it waits until the copy key is pressed. If the CPU 31 judges that the copy key is pressed (step S51: YES), it displays a copy setting screen on the display unit 36 (step S52). FIG. 16A and FIG. 16B are schematic views showing one example of the copy setting screen. The copy setting screen has software keys for receiving settings about the density, image quality and magnification power for printing, and a software key (tint block list key 36a) for setting tint block data to be added to print data. When the tint block setting key 36a is pressed on the copy setting screen, as shown in the schematic view of FIG. 16B, a tint block specifying screen with tint block specifying keys 36c for specifying tint block data is displayed on the display unit 36. When a basic setting key 36b is pressed on the tint block specifying screen, the CPU 31 performs the process of returning the display to the copy setting screen.

The CPU 31 of the multi-function printer 30 judges whether or not a tint block is specified through the tint block specifying screen (step S53). If the CPU 31 judges that no tint block is specified (step S53: NO), the CPU 31 judges whether or not a request to start the copy process is received (step S54). If the CPU 31 judges that a request to start the copy process is not received (step S54: NO), it waits until a request to start the copy process is received. On the other hand, if the CPU 31 judges that a request to start the copy process is received (step S54: YES), it starts to read the image of a document set on the document platen or the automatic feeder (not shown) (step S56), and performs print processing by transferring the image data obtained by reading the image to the image forming section 38 (step S57).

Moreover, when it is judged at step S53 that a tint block is specified (step S53: YES), the CPU 31 judges whether or not a request to start the copy process is received (step S58). If the CPU 31 judges that a request to start the copy process is not received (step S58: NO), it waits until a request to start the copy process is received. If the CPU 31 judges that a request to start the copy process is received (step S58: YES), it starts to read the image of a document set on the document platen or the automatic feeder (not shown) (step S59). Then, the CPU 31 reads the tint block data specified through the tint block specifying screen from the tint block data storing region 40b (step S60), and adds a restraining image to the print data by compositing the read tint block data onto the image data for printing (step S61). Next, the CPU 31 transfers the print data to the image forming section 38 to perform print processing (step S62).

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
an image transmitting apparatus that stores image data for an image to be formed on a sheet and transmits the stored image data to an external device;
a relay device that is connected to the image transmitting apparatus which comprises:
a storage unit which stores pattern data for a tint block pattern,
a composite means for obtaining composite data consisting of the pattern data stored by the storage unit composited onto the image data transmitted from the image transmitting apparatus,
a creation means for creating an image formation job based on the composite data obtained by the composite means, and
a transmitting unit which transmits the image formation job created by creation means; and
an image forming apparatus that is connected to the relay device and comprises a forming section which forms an image on a sheet, based on the image formation job transmitted from the relay device, wherein
the image formed by the forming section is an image composed with the image having been stored and transmitted by the image transmitting apparatus to be formed on a sheet and with the tint block pattern having been stored by the relay device.

2. An image forming system comprising:
an image forming apparatus having an image data storage unit that stores image data for an image to be formed on a sheet, and a transmitting unit that transmits the image data stored by the image data storage unit to an external apparatus; and
an image transmitting apparatus that is connected to the image forming apparatus and comprises:
a pattern data storage unit which stores pattern data for a tint block pattern,
a composite means for obtaining composite data consisting of the pattern data stored by the pattern data storage unit composited onto the image data transmitted from the image forming apparatus,
a creation means for creating an image formation job based on the composite data obtained by the composite means, and
a transmitting unit which transmits the image formation job created by the creation means, wherein
the image forming apparatus further comprises a forming section that forms an image on a sheet, based on the image formation job transmitted from the image transmitting apparatus, wherein
the image formed by the forming section is an image composed with the image having been stored and transmitted by the image forming apparatus to be formed on a sheet and with the tint block pattern having been stored by the image transmitting apparatus.

3. An image forming system comprising:
an image transmitting apparatus that stores image data for an image to be formed on a sheet and transmits the stored image data to an external device;
a relay device that is connected to the image transmitting apparatus and comprises:
a storage unit which stores pattern data for a tint block pattern,
a controller which obtains composite data consisting of the pattern data stored by the storage unit composited onto the image data transmitted from the image transmitting apparatus and creates an image formation job based on the obtained composite data, and
a transmitting unit which transmits the image formation job created by controller; and
an image forming apparatus that is connected to the relay device and comprises a forming section which forms an image on a sheet, based on the image formation job transmitted from the relay device, wherein
the image formed by the forming section is an image composed with the image having been stored and transmitted by the image transmitting apparatus to be formed on a sheet and with the tint block pattern having been stored by the relay device.

4. An image forming system comprising:

an image forming apparatus having an image data storage unit that stores image data for an image to be formed on a sheet, and a transmitting unit that transmits the image data stored by the image data storage unit to an external apparatus; and an image transmitting apparatus that is connected to the image forming apparatus and comprises:

a pattern data storage unit which stores pattern data for a tint block pattern, a controller which obtains composite data consisting of the pattern data stored by the storage unit composited onto the image data transmitted from the image forming apparatus and creates an image formation job based on the obtained composite data, and a transmitting unit which transmits the image formation job created by controller, wherein the image forming apparatus further comprises a forming section that forms an image on a sheet, based on the image formation job transmitted from the image transmitting apparatus, wherein the image formed by the forming section is an image composed with the image having been stored and transmitted by the image forming apparatus to be formed on a sheet and with the tint block pattern having been stored by the image transmitting apparatus.

* * * * *